United States Patent [19]

Matsuo

[11] Patent Number: 4,665,349
[45] Date of Patent: May 12, 1987

[54] APPARATUS FOR CONTROLLING THE RUNNING OF CARRIAGE

[75] Inventor: Yukito Matsuo, Yokohama, Japan

[73] Assignee: Kabushiki Kaisha Toshiba, Kawasaki, Japan

[21] Appl. No.: 716,201

[22] Filed: Mar. 26, 1985

[30] Foreign Application Priority Data

Mar. 26, 1984 [JP] Japan ................................. 59-58853

[51] Int. Cl.⁴ ............................................ H02K 41/00
[52] U.S. Cl. ...................................... 318/135; 310/13
[58] Field of Search ................... 318/37, 38, 121, 135; 310/12, 13, 14

[56] References Cited

U.S. PATENT DOCUMENTS

| | | | |
|---|---|---|---|
| 3,356,041 | 12/1967 | Bliss | 310/12 X |
| 3,549,966 | 12/1970 | Wilson | 310/13 X |
| 3,621,349 | 11/1971 | Reyx | 310/13 X |
| 3,719,869 | 3/1973 | Coho | 310/13 X |
| 3,721,874 | 3/1973 | Pelenc et al. | 310/12 X |
| 3,912,991 | 10/1978 | Moyse | 318/135 X |
| 3,934,184 | 1/1976 | Bönig | 318/135 |
| 4,068,152 | 1/1978 | Nakamura | 318/135 |
| 4,238,715 | 12/1980 | Parsch | 318/135 |
| 4,381,478 | 4/1983 | Saijo | 318/135 |
| 4,463,300 | 7/1984 | Mayne | 318/135 X |
| 4,491,777 | 1/1985 | Beck | 318/135 X |

FOREIGN PATENT DOCUMENTS 55-119616 9/1980 Japan .

*Primary Examiner*—Donovan F. Duggan
*Attorney, Agent, or Firm*—Schwartz, Jeffery, Schwaab, Mack, Blumenthal & Evans

[57] ABSTRACT

The kinetic energy or speed of a carriage running under inertia is detected and the forward or reverse propelling force imparted to the carriage is varied in accordance with the detected kinetic energy or speed for accelerating, decelerating or stopping the carriage without undue shock.

16 Claims, 7 Drawing Figures

APPARATUS FOR CONTROLLING THE RUNNING OF CARRIAGE

BACKGROUND OF THE INVENTION

1. Field of the Invention

This invention relates to control apparatus for a carriage which is given with a propelling force and runs by its inertia, the apparatus being capable of accelerating or decelerating the carriage and more particularly control apparatus capable of applying an appropriate acceleration or deceleration corresponding to the kinetic energy of the carriage.

2. Description of the Prior Art

The control apparatus of the type described above is used in a conveyer system utilizing a linear induction motor, for example. In a linear induction motor, magnetic flux which varies with time is applied to a reaction plate and by the variation in the magnetic flux, a definite propelling force is created in the reaction plate. When the direction of the magnetic field is changed, a reverse propelling force can be produced. In this system, the reaction plate is secured to the carriage whereby the linear induction motor applies a forward propelling force or a reverse propelling force to the carriage for effecting start, acceleration, deceleration or stopping control of the carriage.

Where it is desired to further accelerate, or decelerate and stop a carriage running under inertia after acceleration with a linear motor, by using another linear motor, a problem arises as to how to apply to the carriage an appropriate acceleration force (forward propelling force) or deceleration force (reverse propelling force). More particularly, where it is desired to further accelerate a carriage running under inertia, it is necessary to apply an adequate additional propelling force corresponding to the mass and speed of the carriage. When the applied propelling force is not adequate, it would be impossible to accelerate the carriage to a desired speed. To decelerate or stop a carriage running under inertia, it is necessary to apply to the carriage an adaquate reverse propelling force corresponding to the mass and speed of the carriage. When the reverse propelling force thus applied is not adequate, not only will a severe impact be given to the carriage, but also there is a case in which it is impossible to decelerate the carriage to a desired speed. Furthermore in other cases, it is impossible to stop the carriage at a desired position. Where the applied reverse propelling force exceeds the inertia of the carriage, the carriage may jump in the opposite direction which is of course extremely dangerous.

To solve these problems, there has been proposed a control apparatus disclosed in Japanese Patent Application No. 26460/1979 (Laid Open Patent Specification No. 119616/1980). According to this prior art technique, the mass of the carriage is detected from its speed immediately after starting for controlling the braking force applied to the carriage based on the detected mass and speed thereof. According to this technique, however, it is not always possible to correctly detect the mass of the carriage due to the condition of the conveying road or path at the time of starting. For this reason, it has been impossible to apply an adequate braking force to the carriage.

SUMMARY OF THE INVENTION

It is an object of this invention to provide controlling apparatus for accelerating, decelerating or stopping a carriage without any undue shock.

Another object of this invention is to provide novel apparatus for efficiently accelerating, decelerating or stopping a carriage operated by a linear induction motor.

According to this invention, there is provided apparatus for controlling a carriage running under inertia created by a propelling force imparted thereto for accelerating or decelerating the carriage, comprising first means for imparting a predetermined forward propelling force or reverse propelling force to the carriage for a predetermined interval; second means provided on the front side of the first means for imparting a predetermined forward propelling force or reverse propelling force to the carriage for a predetermined interval; first speed detecting means for detecting the speed of the carriage before passing by the second means; second speed detecting means for detecting the speed of the carriage after passing by the second means; computing means for calculating the forward or reverse propelling force applied by the first means based on a force applied by the second means and the outputs of the first and second speed detecting means; and control means for controlling the first means such that the forward or reverse propelling force calculated by the computing means will be applied to the carriage.

According to another aspect of this invention, there is provided a control apparatus for controlling a carriage running under inertia created by a propelling force imparted thereto for accelerating or decelerating the carriage, comprising first means for imparting positive or negative kinetic energy to the carriage; second means for detecting the kinetic energy of the carriage; and control means for controlling the kinetic energy imparted to the carriage by the first means based on the kinetic energy detected by the second means.

DESCRIPTION OF THE PREFERRED EMBODIMENT

Figure 1:
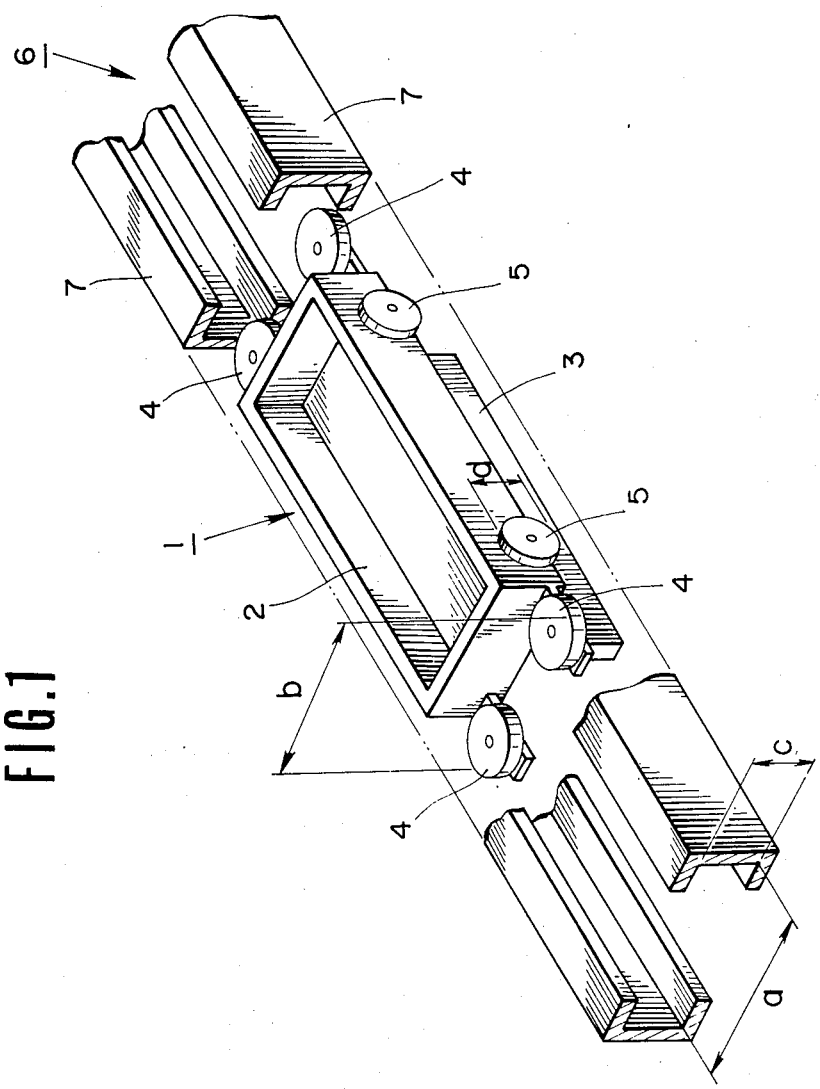
FIG. 1 is a perspective view showing a carriage and guide rails.
Figure 2:
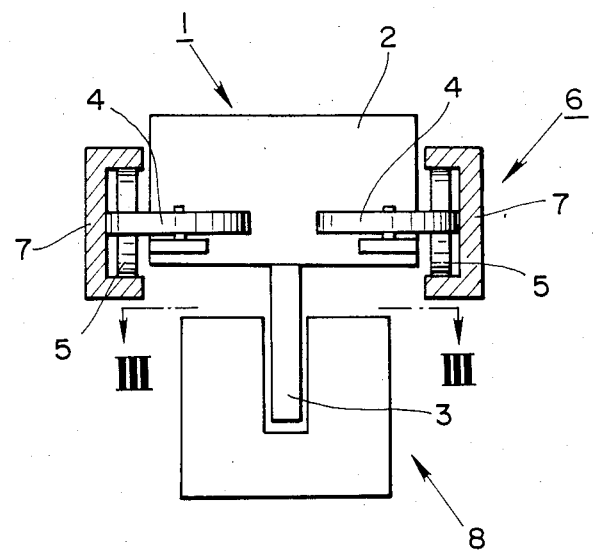
FIG. 2 is a cross-sectional view of the carriage and guide rails.
Figure 3:
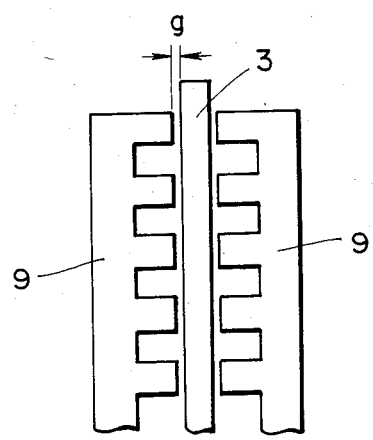
FIG. 3 is a sectional view taken along a line III—III in FIG. 2.
Figure 4A:
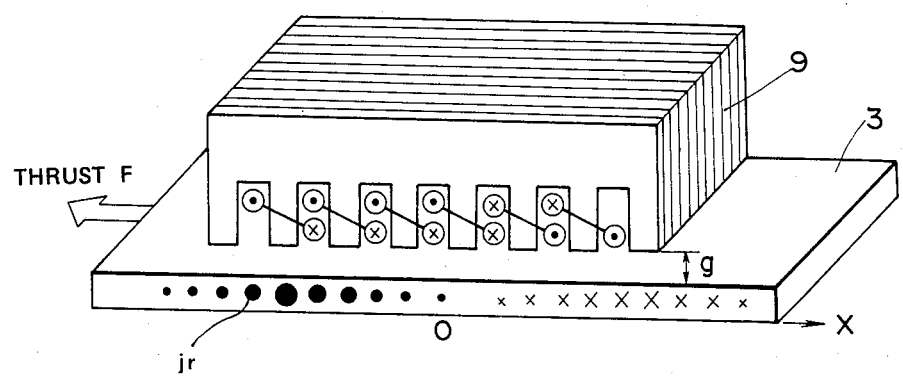
FIG. 4a is a perspective view showing the construction of a linear induction motor.

Referring now to FIGS. 1 and 2, a carriage 1 comprises a rectangular casing 2 adapted to carry goods, and a vertical reaction plate 3 connected to the bottom of the casing. The reaction plate 3 comprises a metal plate made of an electric conductor such as copper, aluminum, etc. and constructed to be subject to a forward or reverse propelling force created by magnetic flux generated by a stator 9 to be described later. Two pairs of horizontal wheels 4 projecting beyond the front and rear frames of the casing are provided at the front and rear ends of the carriage 2. Further, two pairs of wheels 5 are provided on both sides of the casing 2. The conveying road 6 is constituted by a pair of opposed U shaped guide rails 7. The distance a between the inner surfaces of the guide rails 7 is slightly larger than the distance b between the outer peripheries of the wheels 4. The distance c between the upper and lower flanges of each guide rail 7 is slightly larger than the diameter d of each wheel 5. A linear induction motor 8 is disposed beneath the conveying road 6. The motor 8 is constituted by the reaction plate 3 depending from the casing 1 to act as a movable element and a pair of stators 9 disposed on the opposite sides of the reaction plate. As shown in FIG. 3 and 4a, each stator 9 is constituted by laminated electric sheets stamped with teeth and grooves. In each tooth, a coil is wound. A gap of a predetermined width g is defined between the reaction plate 3 and each stator 9.

Figure 4B:
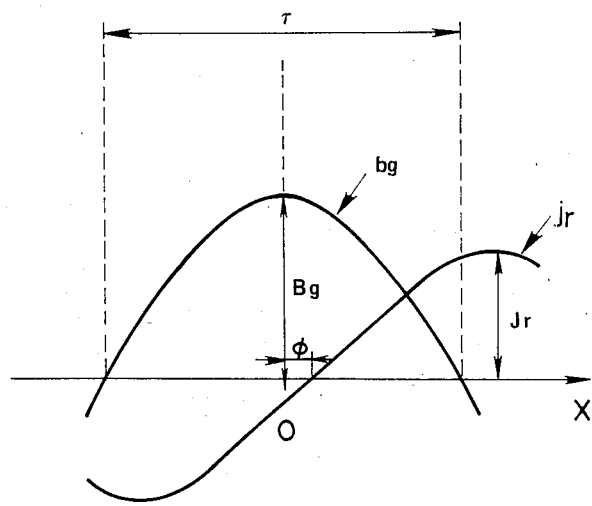
FIG. 4b is a graph showing the relationship between the magnetic flux and the eddy current.

The principle of generating the forward and reverse propelling forces of a linear induction motor will be described with reference to FIGS. 4a and 4b. FIG. 4a is a perspective view showing a linear induction motor comprising a reaction plate 3 and a single stator 9 on one side thereof, while FIG. 4b is a graph showing the relationship between magnetic flux bg and eddy current jr. When two or 3 phase alternating current is passed through the coils of the stator 9, the instantaneous value bg(T) of the flux density in the gap in expressed by the following equation:

$$bg = Bg \cos(wt - \pi x/\tau)$$

where
Bg:crest value of the flux density
$w = 2\pi f$, the angular frequency (rad/s) of the source voltage
f:frequency (Hz)
t:time (s)
x:distance (m) along the stator surface
$\tau$:pole pitch The pole pitch $\tau$ has a length of one half period of the flux density. Since the magnetic flux generated by the stator 9 alternates, it induces eddy current in the reaction plate 3 or a movable member according to Lenz's law. Marks ● and x, depicted in the section of the reaction plate 3 shown in FIG. 4a represent the direction and magnitude of the eddy current. Denoting the crest value of the eddy current by Jr, the instantaneous value of the eddy current can be shown by the following equation:

$$jr = Jr \sin(wt - \pi x/\tau - \phi)$$

where $\phi$ represents the phase difference caused by the impedance of the reaction plate 3. Since the flux in the gap forms a shifting field, the product of the flux density bg and the instantaneous value jr of the eddy current produces a continuous thrust F according to the left hand law of Fleming. Although the thrust F is created in the left and right directions in FIG. 4a, since bg x jr in the lefthand region in FIG. 4b is larger than that in the righthand region, the reaction plate 3 will move to the left. In order to apply a reverse propelling force to the reaction plate 3, alternating current of the opposite phase should be passed through the coils of the stator 9. The thrust F can be varied by varying the frequency f of the alternating current or by varying the amplitude of the alternating current.

Figure 5:
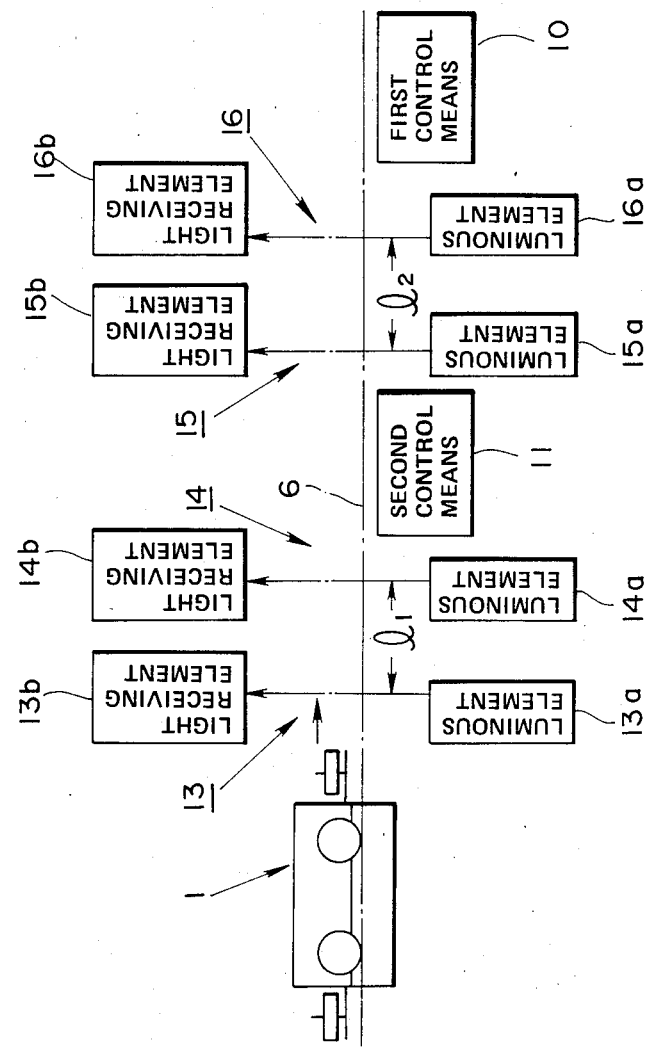
FIG. 5 is a diagrammatic view showing the arrangement of detecting means and control means of the carriage.
Figure 6:
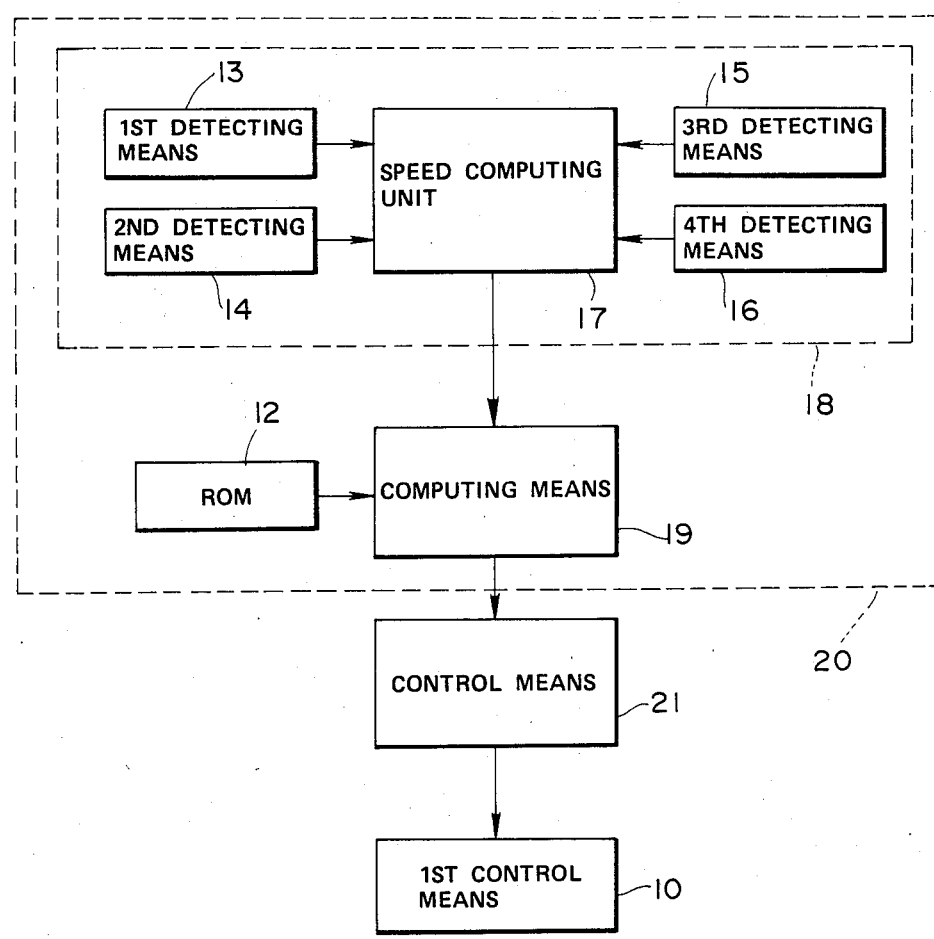
FIG. 6 is a block diagram showing a control system embodying the invention.

The control apparatus of this invention will be described with reference to FIGS. 5 and 6. A first linear induction motor 10 acting as a first control means applies a predetermined reverse thrust to the reaction plate 3, the magnitude of the reverse thrust being controlled by control means 21 to be described later. A second linear induction motor 11 acting as second control means is disposed in the front side of the first control means 10 for imparting a definite reverse thrust to the reaction plate 3. The amount of movement Ft corresponding to the definete reverse thrust is stored in a ROM 12. On the front side of the second control means 11 are disposed first and second detecting means 13 and 14 with a spacing $l_1$ therebetween. The first and second detecting means 13 and 14 are constituted by luminous elements 13a and 14a and light receiving elements 13b and 14b which are disposed on the opposite sides of the conveying road or path 6. Between the first and second control means 10 and 11 are disposed third and fourth detecting means 15 and 16 with a spacing $l_2$ therebetween. The third and fourth detecting means 15 and 16 are constituted by luminous elements 15a and 16a and light receiving elements 15b and 16b disposed on the opposite sides of the conveying road 6. A speed computing unit 17 which inputs the outputs of the first to fourth detecting means 13-16 calculates the speed $v_1 = l_1/t_1$ of the carriage 1 (before control of the carriage by second control means 11) based on an interval $t_1$ between the detection of the carriage 1 by the first detecting means 13 and the detection of the carriage 1 by the second detecting means 14 and the spacing $l_1$. The speed $v_2 = l_2/t$ of the carriage 1 (after control of the carriage by control means 11) is calculated based on an interval $t_2$ between the detection of the carriage 1 by the third detecting means 15 and the detection of the carriage by the fourth detecting means 16 and the spacing $l_2$. The first to fourth detecting means 13-16 and the speed computing means 17 constitute a speed detecting means 18. A computing means 19 calculates the kinetic energy E of the carriage 1 based on the output of the speed detecting means 18 and the output of ROM 12. More particularly, according to the law of conservation of momentum, the following equation holds:

$$m \cdot v_1 - Ft = m \cdot v_2 \qquad (1)$$

where m represents the mass of carriage 1. Since the speeds $v_1$ and $v_2$ and the momentum Ft are known, the mass of the carriage can be determined. Based on the mass m, the kinetic energy E is shown by $$E = \tfrac{1}{2} \cdot m \cdot v_2^2 \qquad (2)$$

The second control means 11, ROM 12, speed detecting means 18 and computing means 19 constitute kinetic energy detecting means 20. In response to the output of the kinetic energy detecting means 20, the control means 21 determines a predetermined reverse propelling force that positively decelerates the carriage without excessive shock and then applies to the carriage 1 the reverse propelling force via the first control means 10.

The apparatus as above described operates as follows. To apply the propelling force to the carriage, 2 or 3 phase AC current is passed through the coils of the stator 9 to cause it to generate magnetic flux. Then eddy current is induced in the reaction plate 3 by the magnetic flux, and the product of the flux and the eddy current produces a continuous propelling force F according to the lefthand law of Fleming. When applied with the propelling force F, the body 1 runs along the road 6 by wheels 4 and 5 guided by guide rails 7. Goods of various weights are mounted on the casing so that in many cases the total weight of the load is unknown. The speed of the carriage 1 varies variously due to the friction caused by its weight and the condition of the conveying road. In view of this fact, according to this embodiment, at the time of controlling the carriage by the first control means, the kinetic energy of the carriage is predetermined so as to apply a correct control force by the first control means in accordance with the kinetic energy. In this embodiment, to calculate the kinetic energy, the speed $V_2$ and the mass m of the carriage 1 are determined. More particularly, the speed computing unit 17 inputted with the outputs of the third and fourth detecting means 15 and 16 deposed on the front side of the carriage with the spacing $l_2$ therebetween calculates the speed $v_2 = l_s/t_2$ by utilizing the spacing $l_2$ and the interval $t_2$ in which the carriage 1 passes by the third and fourth detecting means 15 and 16. The mass of the carriage 1 is detected by applying a definite reverse propelling force to the carriage 1 before it reaches the first control means 10, and then determining the speeds $v_1$ and $v_2$ of the carriage 1 before and after application of the reverse propelling force. The definite reverse propelling force is imparted by the second control means 11, which is created by passing reverse phase alternating current through the coils of the stator constituting the second contorl means 11. The definite reverse propelling force may be sufficiently small such as to create a desired speed difference. The detection of the speed $v_1$ of the carriage 1 prior to the application of the definite reverse propelling force by the second control means 11 can be made similarly based on the outputs of the first and second detecting means. The computing means 19 is inputted with speeds $v_1$ and $v_2$ which are determined as above described from the speed computing unit 17 and the definite momentum Ft read out from ROM for calculating the mass m of the carriage 1 according to equation (1). Then the kinetic energy E of the carriage 1 is calculated according to equation (2) using speed $v_2$ and mass m thus determined. In this manner, the kinetic energy of the carriage 1 running toward the first control means 10 can be calculated. Based on the magnitude of the kinetic energy, the second control means 11 variably controls the reverse propelling force imparted by the first control means 10. More particularly, for the carriage 1 having a large kinetic energy, the frequency f or the amplitude of the alternating current passed through the stator coils of the first control means 10 may impart a reverse propelling force which is variably controlled. As above described, the carriage can be positively decelerated without severe shock. After passing by the first control means 10, the carriage 1 is further decelerated by the succeeding control means to stop at a predetermined position.

It should be understood that the invention is not limited to the specific embodiment described above and that many changes and modifications will be obvious to one skilled in the art without departing from true spirit and scope of the invention as defined in the appended claims. For example, the speed can be detected with Doppler apparatus. Furthermore, it should be understood that the construction of the kinetic energy detecting means 20 is not limited to that shown in the embodiment and that various constructions can be used. Instead of applying the invention to a conveying system utilizing a linear motor, the invention can equally be applied to various conveying systems utilizing other various means for controlling a carriage running under inertia. Although the foregoing description concerns a deceleration control, an acceleration control can also be made with a similar apparatus.

What is claimed is:

1. Apparatus for controlling a carriage running under inertia imparted thereto for accelerating or decelerating said carriage, comprising:
   first means provided at a place corresponding to a predetermined position, for imparting a predetermined forward propelling force or reverse propelling force to said carriage for a predetermined period of time;
   second means provided such that said carriage passes said first means after passing said second means for imparting a predetermined forward propelling force or reverse propelling force to said carriage for a predetermined period of time;
   first speed detecting means for detecting a speed of said carriage before passing said second means;
   second speed detecting means for detecting the speed of said carriage after passing said second means;
   computing means for calculating the forward or reverse propelling force to be applied by said first means based on a force applied by said second means and outputs of said first and second speed detecting means; and
   control means for controlling said first means such that the forward or reverse propelling force calculated by said computing means will be applied to said carriage.

2. The apparatus according to claim 1 wherein said carriage includes a reaction member, and wherein said first means is a linear induction motor which acts upon said reaction member to create said forward or reverse propelling force.

3. The apparatus according to claim 1 wherein said carriage includes a reaction member, and wherein said first means and said second means are a respective linear induction motor which acts upon said reaction member to create said forward or reverse propelling force.

4. The control apparatus according to claim 1 wherein said first and second speed detecting means respectively include first and second optical means for detecting passing of said carriage so as to detect the speed of said carriage in accordance with a difference of the detected times of said first and second optical means.

5. The apparatus according to claim 1 wherein said computing means comprises memory means for storing a force to be imparted by said second means so as to calculate said forward or reverse propelling force to be applied by said first means based on a content of said memory means and outputs of said first and second speed detecting means.

6. The apparatus according to claim 1 wherein said first means applies said reverse propelling force to said carriage for stopping the same, and wherein said computing means calculates said reverse propelling force for decreasing the kinetic energy of said carriage based on a force imparted by said second means, and outputs of said first and second speed detecting means.

7. Apparatus for controlling a carriage running along a guide rail under inertia imparted thereto for accelerating or decelerating said carriage, comprising:
- first means provided at a place corresponding to a predetermined position in said guide rail, for imparting a predetermined forward propelling force or reverse propelling force to said carriage for a predetermined period of time;
- second means provided in said guide rail such that said carriage passes said first means after passing said second means for imparting a predetermined forward propelling force or reverse propelling force to said carriage for a predetermined period of time;
- first speed detecting means for detecting a speed of said carriage before passing said second means;
- second speed detecting means for detecting the speed of said carriage after passing said second means;
- computing means for calculating the forward or reverse propelling force to be applied by said first means based on a force applied by said second means and outputs of said first and second speed detecting means; and
- control means for controlling said first means such that the forward or reverse propelling force calculated by said computing means will be applied to said carriage.

8. The apparatus according to claim 7 wherein said carriage includes a reaction member, and wherein said first means is a linear induction motor which acts upon said reaction member to create said forward or reverse propelling force.

9. The apparataus according to claim 7 wherein said carriage includes a reaction member, and wherein said first means and said second means are a respective linear induction motor which acts upon said reaction member to create said forward or reverse propelling force.

10. The control apparatus according to claim 7 wherein said first and second speed detecting means respectively include first and second optical means for detecting passing of said carriage so as to detect the speed of said carriage in accordance with a difference of the detected times of said first and second optical means.

11. The apparatus according to claim 7 wherein said computing means comprises memory means for storing a force to be imparted by said second means so as to calculate said forward or reverse propelling force to be applied by said first means based on a content of said memory means and outputs of said first and second speed detecting means.

12. The apparatus according to claim 7 wherein said first means applies said reverse propelling force to said carriage for stopping the same, and wherein said computing means calculates said reverse propelling force for decreasing the kinetic energy of said carriage based on a force imparted by said second means, and outputs of said first and second speed detecting means.

13. The apparatus according to claim 7 wherein said guide rail comprises two parallel guide members each having a first guide surface that prevents lateral movement of said carriage, and a second guide surface that prevents vertical movement of said carriage, and wherein said carriage comprises first guided member disposed between upper and lower surfaces of said carriage, for moving along said first guide surfaces of said guide members, and second guided member disposed spaced apart from said first guided member with respect to the running directions of said carriage, for moving along said second guide surfaces.

14. The apparatus according to claim 13 wherein said first guide surface extends in the vertical direction and said second guide surface extends in the horizontal direction from one vertical end of said first guide surface.

15. The apparatus according to claim 13 wherein said first and second guided members are first and second wheel means rolling along said first and second guide surfaces of said guide members.

16. The apparatus according to claim 13 wherein said first wheel means comprises at least two pairs of wheels disposed spaced apart from each other in the running direction of said carriage, and pivotally supported by vertical shafts mounted on said carriage, and said second wheel means comprises at least two pairs of wheels disposed spaced from each other in the running direction of said carriage, and pivotally supported by horizontal shafts disposed in the transverse direction spaced apart from each other in the running direction of said carriage.

* * * * *